(12) United States Patent
Ishizaki (10) Patent No.: US 6,948,839 B2
(45) Date of Patent: Sep. 27, 2005

(54) ANTI-FOGGING STRUCTURE FOR HEADLIGHT LAMPS

(75) Inventor: Masaru Ishizaki, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/440,926

(22) Filed: May 19, 2003

(65) Prior Publication Data

US 2003/0218885 A1 Nov. 27, 2003

(30) Foreign Application Priority Data

May 24, 2002 (JP) ........................................ 2002-151276

(51) Int. Cl.[7] .................................................. B60Q 1/00
(52) U.S. Cl. ........................ 362/547; 362/294; 362/502; 362/373
(58) Field of Search ................................. 362/547, 294, 362/373, 502, 546, 218, 264, 345; 454/121

(56) References Cited

U.S. PATENT DOCUMENTS

| | | | |
|---|---|---|---|
| 4,931,912 A | * | 6/1990 | Kawakami et al. ......... 362/547 |
| 6,071,000 A | * | 6/2000 | Rapp ........................... 362/547 |
| 6,168,303 B1 | * | 1/2001 | Ashizawa et al. .......... 362/547 |
| 6,497,507 B1 | * | 12/2002 | Weber ......................... 362/547 |
| 6,676,283 B2 | * | 1/2004 | Ozawa et al. ............... 362/547 |

* cited by examiner

Primary Examiner—John Anthony Ward
Assistant Examiner—Bao Q. Truong
(74) Attorney, Agent, or Firm—Rankin, Hill, Porter & Clark LLP (57) ABSTRACT

Conforming with the differing conditions in which the left and right headlight lamps are placed, an anti-fogging structure for headlight lamps is proposed wherein variation in the anti-fogging performance on the left and right does not occur by providing differing structures for the breathing mechanisms in the left and right headlight lamps. In an anti-fogging mechanism for headlight lamps 5L and 5R provided on the left and right of the radiator fan at the front of the body of a vehicle, different structures are provided for the breathing holes that enable circulation of air into and out of the lamp housings 51L and 51R of the left and right headlight lamps 5L and 5R.

9 Claims, 10 Drawing Sheets

ANTI-FOGGING STRUCTURE FOR HEADLIGHT LAMPS

BACKGROUND OF THE INVENTION

1. Field of the Invention

The prevent invention relates to an anti-fogging structure for a headlight lamp.

2. Description of the Related Art

An anti-fogging structure for the headlight lamps of a vehicle or the like, as disclosed, for example, in Japanese Unexamined Patent Application, First Publication, No. 2001-10403, draws air inside the headlight lamp from an intake opening and discharges it from a discharge opening. In addition, Japanese Unexamined Patent Application, First Publication, No. Hei 11-86614, discloses a structure in which the air in a headlight lamp housing is smoothly discharged to the outside from an air hole by preventing circulation of air in the headlight lamp housing.

However, in the conventional anti-fogging structure for a headlight lamp described above, because the conditions in which the left and right headlight lamps are placed are subtly different, there is the problem that a difference in the performance of the condensation on the left and right headlight lamps occurs.

For example, in a normal vehicle having a radiator fan that rotates in a predetermined direction, a bias occurs in the pressure conditions where the left and right headlight lamps are placed, and in addition, in a vehicle having a structure wherein the engine, which is a source of heat, is disposed offset to either the left or right, a bias occurs in the temperature conditions in which the left and right headlight lamps are placed, and there is the problem that this causes an unevenness in the anti-fogging performance of the left and right headlight lamps.

Thus, this invention provides uses a structure in which the unevenness in the anti-fogging performance of the left and right headlight lamps is eliminated and the anti-fogging performance is improved by using a structure in which the breathing mechanism of the left and right headlight lamps differ in conformity to the differing conditions in which the left and right headlight lamps are placed.

SUMMARY OF THE INVENTION

In order to solve the above-described problems, a first aspect of the present invention is an anti-fogging structure for headlight lamps (for example, the headlight lamps 5L and 5R in the embodiments) provided to the left and right of the radiator fan (for example, the radiator fan 6 in the embodiments) on the front of the body (for example, the body 1 in the embodiments) of a vehicle, wherein a breathing mechanism (for example, the breathing holes 10, 11, and 12, and the water-repelling filter 13) that makes possible the circulation of air into and out of the lamp housing (for example, the lamp housings 51L and 51R in the embodiments) is structured differently on the left and right headlight lamps.

By using this type of structure, it becomes possible to use a structure wherein, taking into consideration the flow of air generated by the radiator fan, the air in the lamp housing can be easily discharged, while the air flows into the lamp housing with difficulty.

In a second aspect of the invention, the above breathing mechanism comprises breathing holes (for example, the breathing holes 10 and 12 in the embodiments) formed in the back walls (for example, the back walls 52L and 52R in the embodiments) of the lamp housing, and the breathing holes (for example, the breathing holes 10S and 12S in the embodiments) of the headlight lamps (for example the headlight lamp 5L in the embodiments) on the side where the pressure inside the lamp housing is negative due to the rotation of the radiator fan are set to have an aperture area smaller than the breathing holes (for example, the breathing holes 10B and 12B in the embodiments) of the headlight lamps (for example, the headlight lamp 5R in the embodiments) on the side where the pressure inside the lamp housing is positive due to the rotation of the radiator fan.

By using this type of structure, it becomes possible to suppress the inflow of external air as much as possible at the headlight lamp housing having a negative pressure inside, and promote the discharge of internal air as much as possible at the headlight lamp housing having a positive pressure inside.

In a third aspect of the present invention, the above breathing mechanism comprises breathing holes formed in the back walls of the headlight lamp housing, and the number of breathing holes in the headlight lamp on the side where the lamp housing has a positive pressure inside due to the rotation of the radiator fan is greater than the number of breathing holes of the headlight lamp housing on the side where the lamp housing has a negative pressure inside due to the rotation of the radiator fan.

By using this type of structure, it becomes possible to promote the discharge of air from the headlight lamp housing having a positive pressure inside and to suppress the inflow of air into the headlight lamp housing having a negative pressure inside.

In a fourth aspect of the present invention, the above breathing mechanism comprises breathing holes formed in the back wall of the lamp housing, and in the case that an air flow is generated due to the rotation of the radiator fan, each of the breathing holes in the headlight lamp housing (for example, the breathing holes 10B and 11B in the embodiments) is formed downstream of this airflow.

By forming this type of structure, it becomes possible to discharge the air inside each of the headlight lamp housings such that the air is evacuated from the air holes that open downstream of the low-pressure air flow.

In a fifth aspect of the present invention, the above breathing mechanism comprises breathing holes (for example, the breathing holes 10B and 12B in the embodiments) formed in the back wall of the lamp housing and filters (for example the water-repelling filters 13 and 13' in the embodiments) that cover them, wherein the filter (for example, the water-repelling filter 13' in the embodiments) of the headlight lamp housing on the side where the pressure inside the headlight lamp housing is positive due to the rotation of the radiator fan has a density that is lower than the filter (for example, the water-repelling filter 13 in the embodiments) of the headlight lamp housing on the side where the pressure inside the headlight lamp housing is negative due to the rotation of the radiator fan.

By using this type of structure, it becomes possible to promote as much as possible the discharge of internal air in the headlight lamp housing having a positive pressure inside and suppress as much as possible the inflow of external air at the headlight lamp housing having a negative pressure inside.

A sixth aspect of the present invention is an anti-fogging structure for headlight lamps provided on the left and right of the front part of the body of a vehicle having an engine (for example, the engine E in the embodiments) in an engine compartment that is disposed offset either to the left or right, wherein the breathing mechanisms that enables circulation of air into and out of the lamp housing are made different for the left and right headlight lamp housings.

By using this type of structure, considering that the air closer to the engine contains higher content of moisture, it becomes possible to make it difficult for the air to stagnate in the headlight lamp housing on the side near the engine in comparison to the headlight lamp housing on the side distant from the engine.

In a seventh aspect of the invention, the breathing mechanism described above comprises breathing holes, and the breathing holes (for example, the breathing holes 10B and 12B in the embodiments) on the side near the engine are set so that their aperture area is larger than the breathing holes (for example, the breathing holes 10S and 12S in the embodiments) in the headlight lamp housing on the side distant from the engine.

By using this type of structure, the high-temperature and high-moist air near the engine can be discharged easily from the breathing holes having a large aperture area even when such air flows into the lamp housing.

In an eighth aspect of the present invention, the above breathing mechanism comprises breathing holes, and the number of breathing holes in the headlight lamp housing on the side near the engine is greater than the number of breathing holes in the headlight lamp housing on the side distant from the engine.

By having this type of structure, it becomes possible for the high-temperature air that that is near the engine and includes much water to be discharged easily from the many breathing holes even when it flows into the lamp housing.

In a ninth aspect of the invention, the above breathing mechanism comprises breathing holes formed in the back wall of the lamp housing and a filter that covers them, and the filter of the headlight lamp housing on the side near the engine has a lower density than the filter of the headlight lamp housing on the side distant from the engine.

By having this type of structure, it becomes possible for the high-temperature air that that is near the engine and includes much moisture to be discharged easily by passing though the low-density filter that has little resistance.

DESCRIPTION OF THE PREFERRED EMBODIMENTS

Below, embodiments of the invention will be explained with reference to the attached figures. FIG. 1 through FIG. 5 illustrates the first embodiment of the invention.

Figure 1:
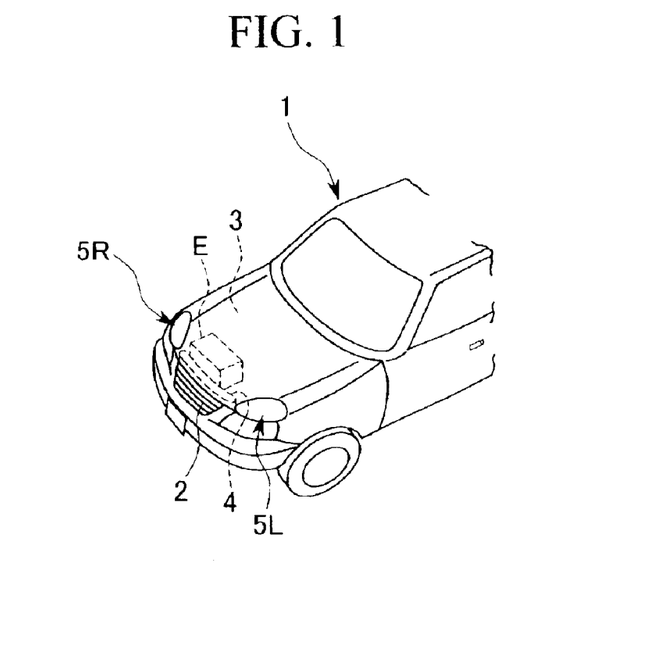
FIG. 1 is a perspective view drawing of the vehicle of the first embodiment.
Figure 2:
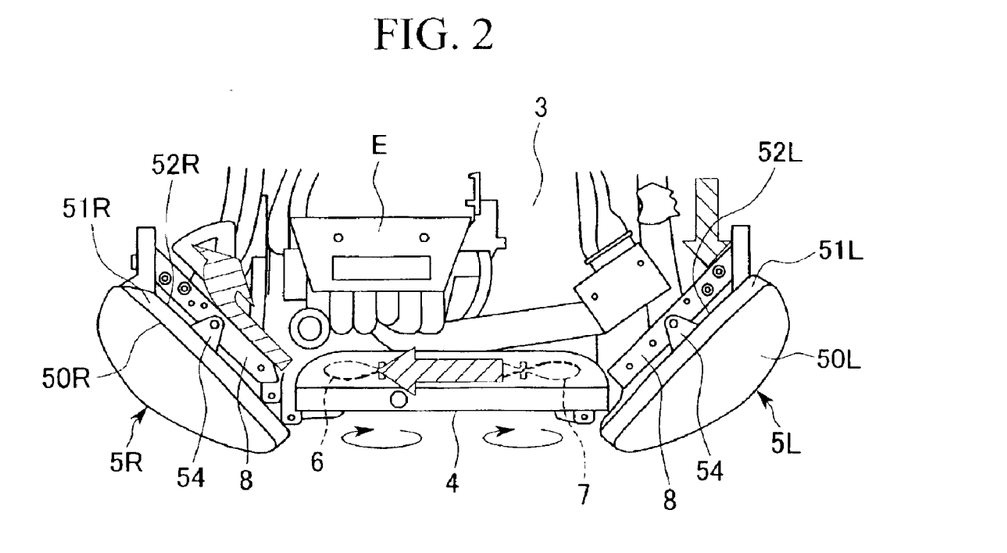
FIG. 2 is a partial plane view showing the inside of the engine compartment in the first embodiment.
Figure 3:
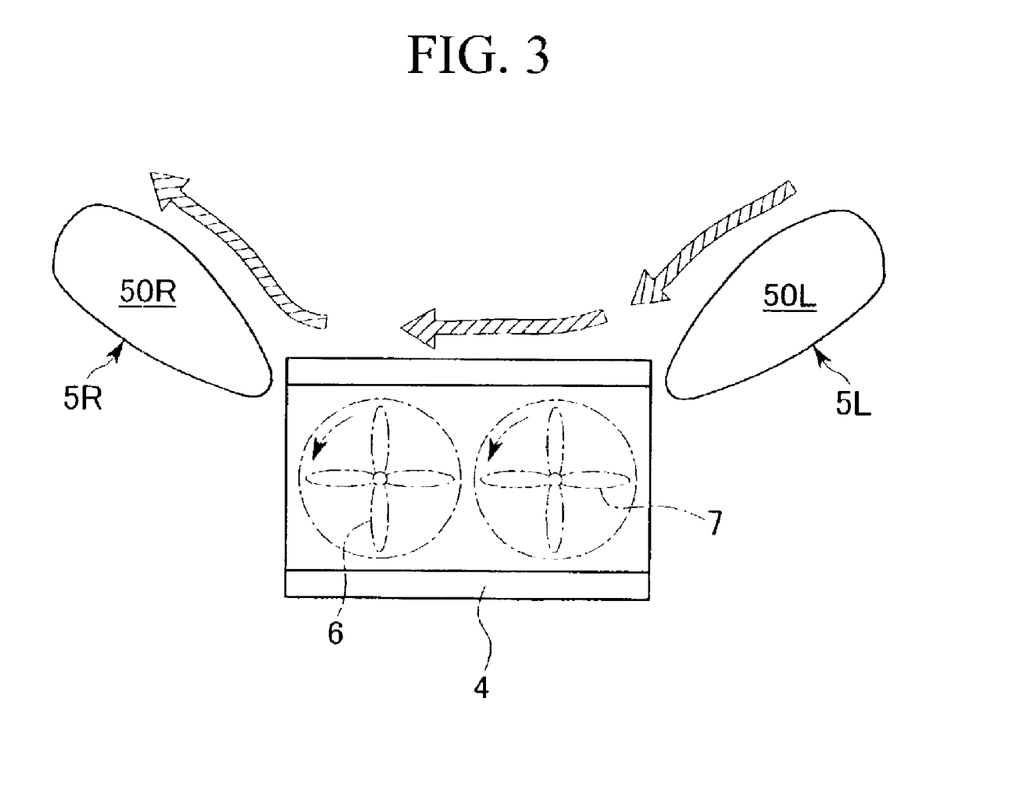
FIG. 3 is a frontal explanatory drawing showing the state of the disposition of the headlight lamps and the radiator in the first embodiment.

As shown in FIG. 1 through FIG. 3, in the front part of the body 1 of a vehicle, a radiator 4 is disposed on the engine compartment 3 side of the front grill 2, and the respective headlight lamps 5L and 5R are provided on both left and right sides of the radiator 4. On the back side of the radiator 4, a radiator fan 6 and an electrical fan 7 for an air-conditioning system are provided. Moreover, L denotes left and R denotes right (and similarly below).

As shown in FIG. 2 and FIG. 3, in the present embodiment, the radiator fan 6 rotates counterclockwise when viewed from the front of the body 1, and, in cooperation with the electrical fan 7 that similarly rotates counterclockwise, produces a flow of air indicated by the arrow towards the headlight lamp 5R on the right side by passing through the front of the radiator 4 from the headlight lamp 5L on the left side. Moreover, E denotes the engine disposed to the side.

Therefore, due to the radiator fan 6 being interposed therebetween, the headlight lamp 5L on the left side positioned upstream of the air flow and the headlight lamp 5R on the right side positioned downstream of the airflow are placed under differing pressure conditions.

The headlight lamps 5L and 5R comprise transparent lenses 50L and 50R and the lamp housings 51L and 51R, and have built-in a light (not illustrated), and the back walls 52L and 52R of the lamp housings 51L and 51R face engine compartment 3.

The brackets 53 and 54 (refer to FIG. 4) of the lamp housings 51L and 51R are fixed to the body panel 8, and thereby the headlight lamps 5L and 5R are mounted on the body 1.

Figure 4:
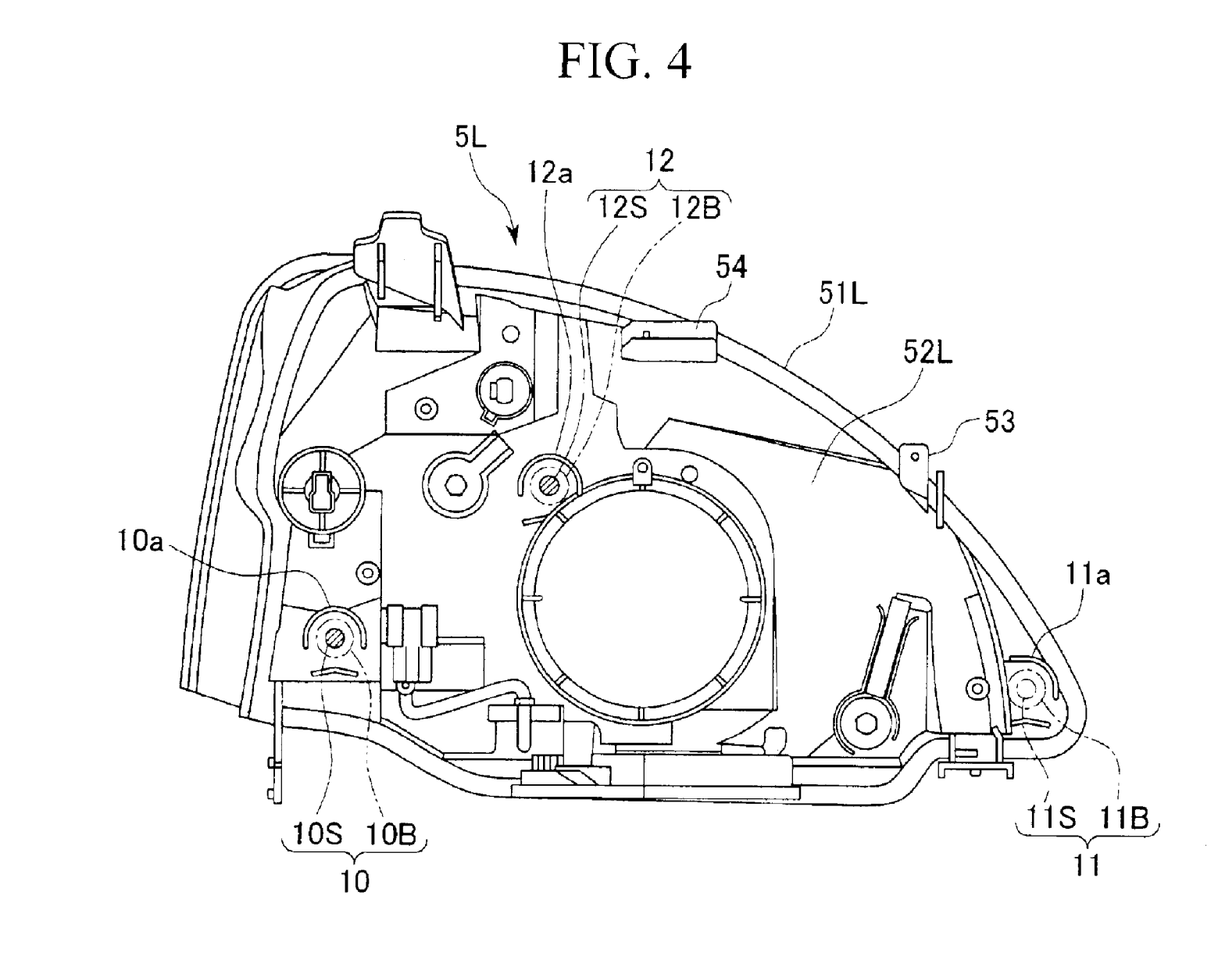
FIG. 4 is an enlarged back view of the left headlight lamp housing in the first embodiment.

Next, the arrangement of the headlight lamps 5L and 5R will be explained using as an example the headlight lamp 5L on the left side shown in FIG. 4. In the back wall 52L of the lamp housing 51L, a breathing mechanism for preventing fogging of the headlight lamp 5L is provided that allows circulation of air into and out of the lamp housing 51L. In addition, this breathing mechanism has a structure that differs from that of the headlight lamp 5R on the right side.

Specifically, the breathing mechanism comprises breathing holes 10, 11, and 12 provided in the back wall 52L of the lamp housing 51L. These breathing holes 10, 11, and 12 are formed as follows: one (breathing hole 10) if formed below the outside portion of the vehicle in the transverse direction (below, referred to simply as the "outer portion"); one (breathing hole 11) is formed below the inner portion of the vehicle in the transverse direction (below, simply referred to as the "inner portion"); and one (breathing hole 12) is formed above the light bulb disposition location at the center portion in the vertical direction of the center portion of the vehicle (below, simply referred to as the "center portion") in the transverse direction of the headlight lamp 5L. Arch shaped roof parts 10a and 11a and a circular arc-shaped roof part 12a are respectively formed above the breathing holes 10, 11, and 12. The penetration of raindrops or car wash water from above into the breathing holes is prevented by these roof parts 10a, 11a, and 12a.

Here, in the outer portion, respectively large sized and small sized breathing holes 10B and 10S are selected and can be formed by being pressed open after a molding step. The breathing holes 12B and 12S respectively having a large size and a small size can be formed in the center portion, and similarly the breathing holes 11B and 11S respectively having a large size and a small size can be formed in the inner portion. Moreover, as shown in FIG. 4, as is shown by the hatching, in the outer portion, the small sized breathing hole 10S is selected; in the inner portion, as is shown by the hatching, the small sized breathing hole 12S is similarly selected; and at the inner portion, the breathing hole 11 is not formed. Here, the breathing holes (correctly referred to as the "breathing hole formation positions") that are not selected are shown by a dashed line.

Next, the structure of the breathing holes in the headlight lamps 5L and 5R in this first embodiment will be explained with reference to FIG. 5. Moreover, the flow of the air is shown in the figure by the arrow. In addition, the large, small, and unselected breathing hole formation positions are denoted by reference numerals (for example, "11") that group the large hole, the small hole, and the unselected hole together (similarly in the following embodiments).

Figure 5A:
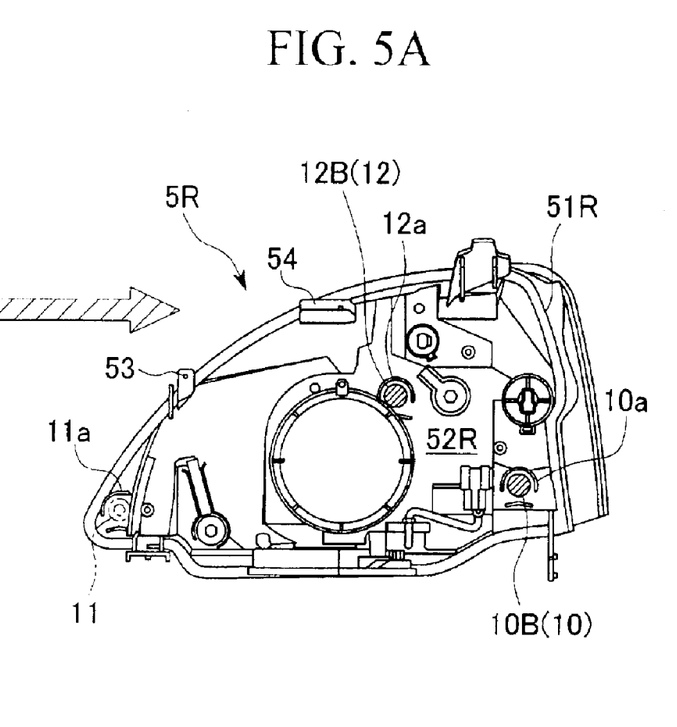
FIGS. 5A and 5B are back views of the left and right headlight lamp housings in the first embodiment.
Figure 5B:
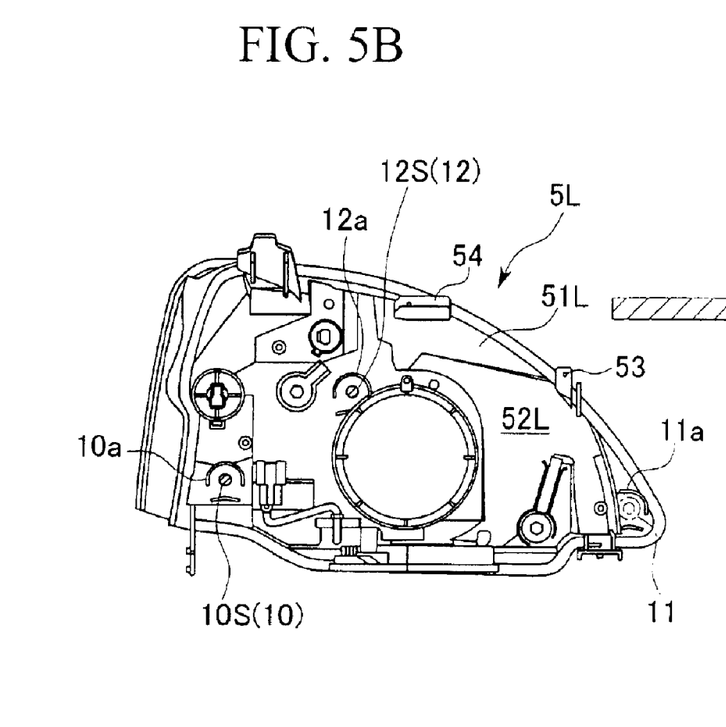

As shown in FIG. 5, breathing holes 10 and 12 are formed in the respective outer portion and the center portion the headlight lamp 5L on the left side and the headlight lamp 5R on the right side. Moreover, breathing hole 11 is not formed in either of the headlight lamps 5L or 5R, but depending on the state of the vehicle, that is, depending on the pressure on the back wall of the lamp housing, breathing holes 10 and 12 can be used instead of the breathing hole 11. In addition, as shown in FIG. 3, each of the breathing holes 10 and 12 in the headlight lamp 5L on the left side with a lamp housing 51L, which has a negative pressure inside due to the rotation of the radiator fan 6 and the electric fan 7, has an aperture area set so as to be smaller than each of the breathing holes 10 and 12 of the headlight lamp 5R on the right side with a lamp housing 51R having a positive pressure inside due to the rotation of the radiator fan 6 and the electric fan 7, and thereby the structures of both are different.

Concretely, the breathing holes 10S and 12S having a small size are formed in the headlight lamp 5L on the left side and the breathing holes 10B and 12B having a large size are formed in the headlight lamp 5R on the right side. Moreover, the parts where the breathing holes 10 and 12 are opened are shown in the figure by the hatching, and the parts where they are not opened are shown by the dashed line (similarly in the following embodiments).

Specifically, when the inside of the leadlight 5L on the left side has a negative pressure due to a negative pressure being established by the rotation of the radiator fan 6 and the electric fan 7, the high humidity air in the engine compartment 3 is drawn into the lamp housing 51L of the headlight lamp 5L on the left side, and there is the possibility that fogging will occur.

To the extent that the amount of air drawn in from the engine compartment 3 is reduced, fog does not occur. Thus, the diameter of the breathing holes 10S and 12S of the outer portion and the center portion of the headlight lamp 5L on the left side is made smaller than the respective diameters of those in the headlight lamp 5R on the right side, the aperture area of each of the breathing holes 10S and 12S of the headlight lamp 5L on the left side, which has a negative pressure and is easily fogged, is made small, and this contributes to making fogging difficult to a degree that is identical to that of the headlight lamp 5R on the right side.

In addition, contrariwise, at the headlight lamp 5R on the right side, the aperture area of the breathing holes 10B and 12B is larger than the that of the headlight lamp 5L on the left side, but because the headlight lamp 5R on the right side is placed under a positive pressure due to the counterclockwise rotation of the electric fan 7, the air inside is discharged into the engine compartment 3 from each of the breathing holes 10B and 12B that have a larger aperture area than that of the headlight lamp 5L on the left side, and thereby the anti-fogging performance is increased.

Therefore, according to this embodiment, the inflow of external air is suppressed as much as possible at the headlight lamp 5L on the left side, which has a negative pressure inside, and the discharge of internal air is promoted as much as possible at the headlight lamp 5R on the right side, which has a positive pressure inside. Thereby, the unevenness in the anti-fogging performance in the left and right headlight lamps 5L and 5R, which originates in the direction of the rotation of the radiator ran 6 and the electric fan 7, is adjusted by changing the aperture area of the breathing holes 10 and 12, the anti-fogging performance is increased, and the uniformity of the illumination characteristics on the left and right can be maintained.

Figure 6:
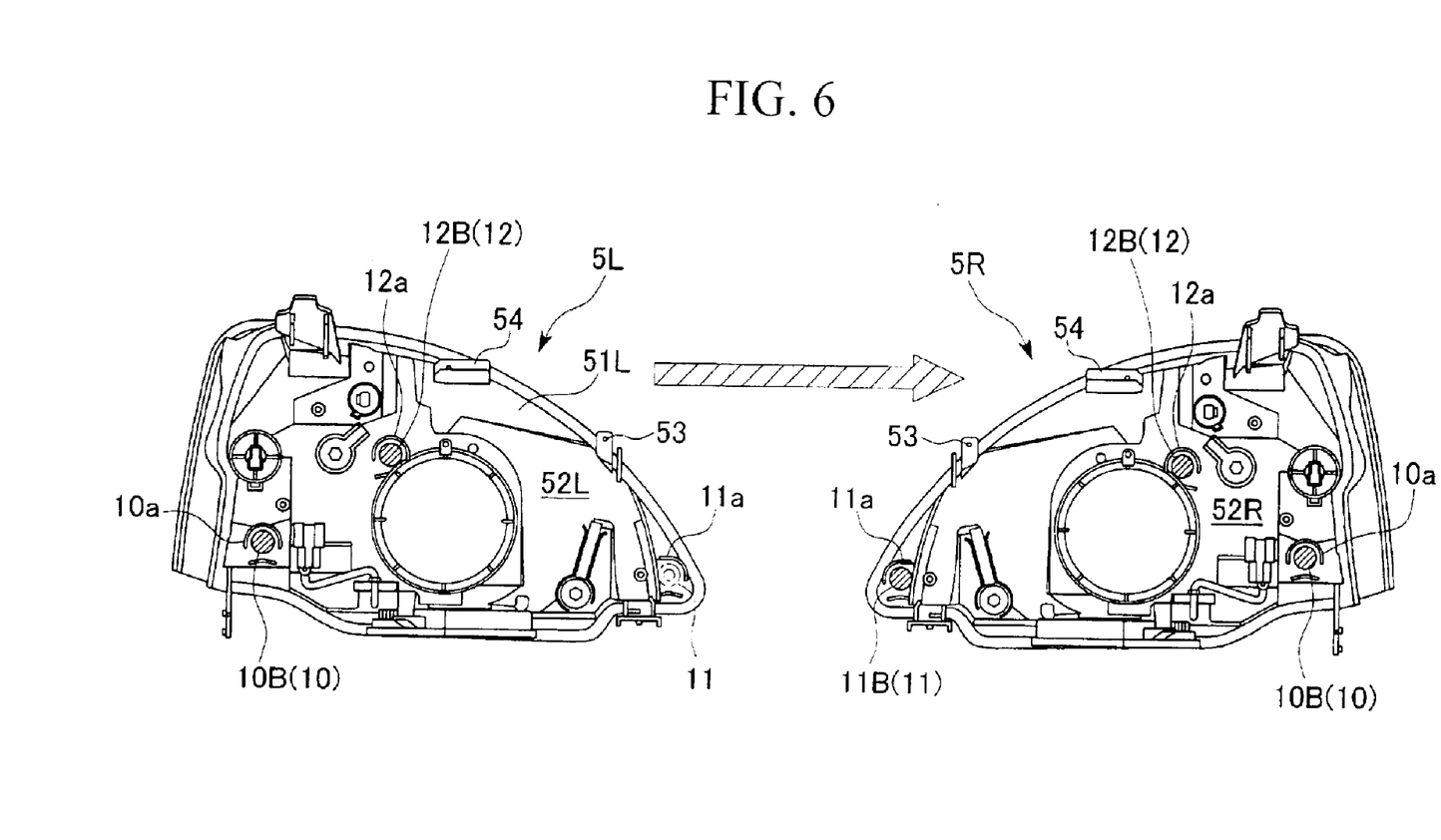
FIG. 6 is a back view of the left and right headlight lamp housings in the second embodiment.

Next, aided by FIG. 1 and FIG. 3, a second embodiment of the present invention will be explained with reference to FIG. 6. Moreover, parts that are identical to those in the first embodiment will be explained denoted by identical numbers.

In this embodiment, the number of the breathing holes formed in the back walls 52L and 52R of the lamp housings 51L and 51R of the respective headlight lamps 5L and 5R is different. Concretely, three breathing holes 10, 11, and 12 are formed in the headlight lamp 5R on the right side, whose lamp housing 51R has a positive pressure due to the rotation of the radiator fan 6 and the electric fan 7, and two breathing holes 10 and 12 are formed in the headlight lamp 5L on the left side, whose lamp housing 51L has a negative pressure due to the rotation of the radiator fan 6 and the electric fan 7. That is, the number of breathing holes in the headlight lamp 5R on the right side is greater than the number of breathing holes in the headlight lamp 5L on the left side. Moreover, the breathing holes 10, 11, and 12 use the large breathing holes 10B, 11B, and 12B having the same size.

The breathing holes 10 and 12 are formed in the inner portion and the center portion of the headlight lamp 5L on the left side identically to the first embodiment, on the right side the breathing holes 10 and 12 are added to the outer portion and center portion in the headlight lamp 5R, and the breathing hole 11 is formed in the inner portion.

Thereby, the amount of air that is discharged from the headlight lamp 5R on the right side, whose inside has a positive pressure due to the rotation of the radiator fan 6 and the electric fan 7, is increased, the discharge of moist air is promoted, and the inflow of air into the headlight lamp 5L on the left side, whose inside has negative pressure, can be suppressed by making the number of breathing holes lower than the headlight lamp 5R on the right side, is decreased. Thus, the unevenness in the anti-fogging performance in the left and right headlight lamps 5L and 5R, which originates in the direction of the rotation of the radiator ran 6 and the electric fan 7, is adjusted by changing the number of the breathing holes, the anti-fogging performance is increased, and the uniformity of the illumination characteristics on the left and right can be maintained.

Moreover, because this embodiment focuses on the number of breathing holes, an example was explained wherein each of the breathing holes 10, 11, and 12 is formed as the breathing holes 10B, 11B and 12B having identical large sizes, but it is also possible to make the breathing holes 10 and 12 on the headlight lamp 5L side have the small-sided breathing holes 10S and 12S.

Next, aided by FIG. 1 and FIG. 3, a third embodiment of the present invention will be explained with reference to FIG. 7. Here, parts with are identical to those in the first embodiment will be explained denoted by identical numbers. Moreover, the arrow in the figure indicates the flow of the air.

In this embodiment, when the airflow indicated by the arrow in FIG. 2 occurs due to the rotation of the radiator fan 6 and the electric fan 7, the breathing holes in each of the headlight lamps 5L and 5R are formed downstream of this airflow.

Figure 7:
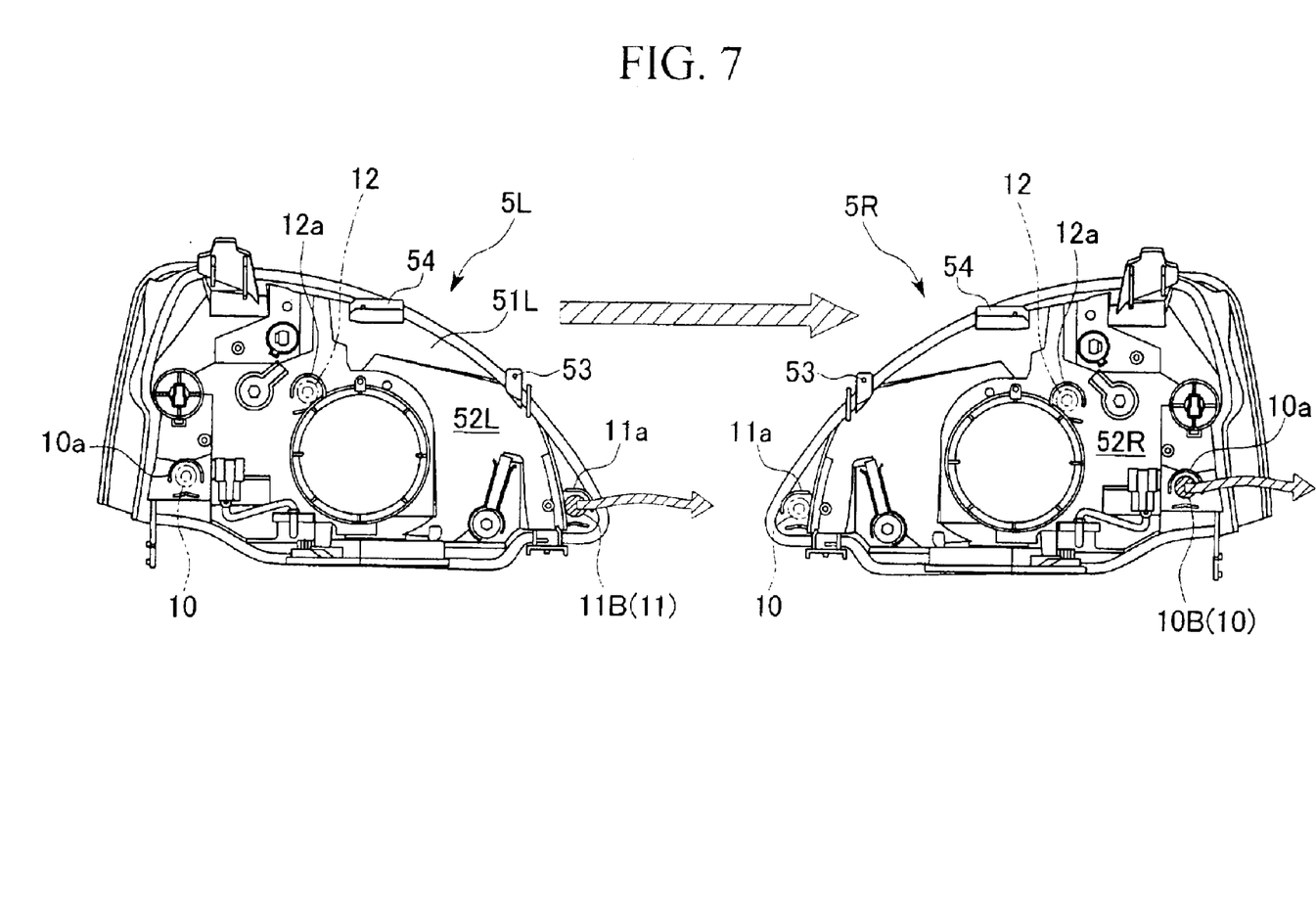
FIG. 7 is a back view of the left and right headlight lamp housings in the third embodiment.

Concretely, in FIG. 7, the flow of the air occurs from the left to the right, but the further downstream of the flow, the pressure becomes progressively lower than it is upstream. This means that the headlight lamp 5R on the right side is placed under a lower pressure than the headlight lamp 5L on the left side, and at the same time, at each of the headlight lamps 5L and 5R, it means that the pressure on the right side is lower than the pressure on the left side. Specifically, at the headlight lamp 5R on the right side, in the transverse direction of the vehicle the pressure at the outer side is lower than the pressure at the center side, and at the headlight lamp 5L on the left side, the pressure at center side in the transverse direction of the vehicle is lower than the pressure at the inner side. Focusing on this factor, in this embodiment, the breathing hole 11B is formed in the inner portion of the headlight lamp 5L on the left side, and the breathing hole 10B is formed in the inner portion of the headlight lamp 5R on the right side. That is, the formation positions of the breathing holes at the left and right headlight lamps 5L and 5R are varied.

Therefore, the air inside each of the headlight lamps 5L and 5R can be discharged by being drawn out from each of the breathing holes 11B and 10B that open downstream of the airflow having low pressure, and thus the unevenness in the anti-fogging performance in the left and right headlight lamps 5L and 5R, which originates in the direction of the rotation of the radiator ran 6 and the electric fan 7, is adjusted by discharging air inside both the lamp housings 51L and 51R, the anti-fogging performance is increased, and the uniformity of the illumination characteristics on the left and right can be maintained.

Next, aided by FIG. 1 and FIG. 3, a fourth embodiment of the present invention will be explained with reference to FIG. 8 and FIG. 9. Here, parts with are identical to those in the first embodiment will be explained denoted by identical numbers. Moreover, the arrow in the figure indicates the flow of the air.

In this embodiment, a breathing mechanism is formed comprising the breathing holes 10 and 12 formed in the back walls 52L and 52R of the lamp housings 51L and 51R and the water-repellant filters 13 and 13' that cover them. The water-repellant filter 13 prevents penetration of water but allows the passage of air, and the higher its density, the more difficult it is for air to pass through. Moreover, sponge can be used instead of a water-repellant filter.

Figure 9:
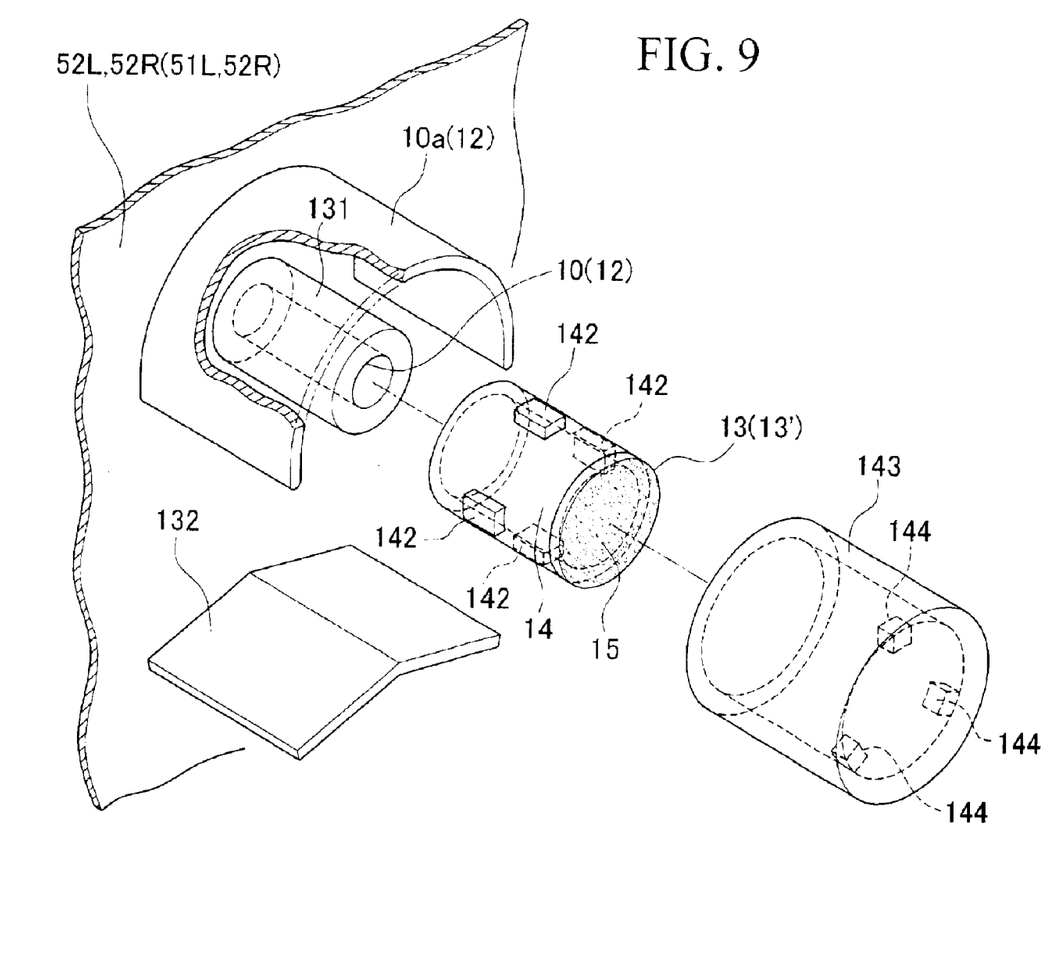
FIG. 9 is a perspective view showing the installation state of the water-repelling filter in the fourth embodiment.

As shown in FIG. 9, a rubber filter mounting part 131 is installed under the arch-shaped roof parts 10a and 12a formed in the back walls 52L and 52R of the lamp housings 51L and 51R and extends in a pipe-form to a position that is accommodated in these roof parts 10a and 12a. Under the filter mounting part 131, water falls by being guided downward, and the roof-shaped water guide 132 is installed to prevent water from splashing up from below.

In addition, at the filter mounting parts 131, breathing holes 10 and 12 are formed that communicate with the inside of the lamp housings 51L and 51R by passing through the center portion, and the water-repellant filters 13 and 13' are installed in the filter mounting part 131. Moreover, in the following explanation, an example is explained using the water-repellant filter 13 in the headlight lamp 5L on the left side, and the explanation of the water-repellant filter 13' in the headlight lamp 5R on the right side having an identical structure will be omitted. In addition, the opening diameter of the breathing holes 10 and 12 can be either the aperture diameter of the large breathing holes 10B and 12B or the aperture diameter of the small breathing holes 10S and 12S.

The water-repellant filters 13 are cap-shaped members comprising a tubular portion 14 that is mounted by being inserted into the filter insertion part 131 and a filter body 15, and four separate projections 142 are formed on the periphery of the tubular portion 14.

In addition, a synthetic resin stopping cap 143 having a tubular shape with a bottom that covers the same is installed on the water-repellant filter 13, and when the stopping cap 143 is installed in the water-repellant filter 13, the air flow path between the two is maintained by these projections 142. At the position corresponding to the filter body 15 of the stopping cap 143, spacer projections 144 are formed at 3 locations along the peripheral direction, a space between the stopping cap 143 and the filter body 15 during installation is maintained, and can communicate with the air flow path formed by the projections 142.

Here, the structure of each of the headlight lamps 5L and 5R is identical on the point of installing the water-repellant filters 13 and 13' on the breathing holes 10 and 12 at the outside position and the center position, but the density of the water-repellant filters 13 and 13' varies between the headlight lamp 5L on the left side and the headlight lamp 5R on the right side, and the water-repellant filter 13' of the headlight lamp 5R on the right side placed under positive pressure due to the rotation of the electric fan 7 has a lower density than the water-repellant filter 13 of the headlight lamp 5L on the left side that has been placed under a negative pressure due to the rotation of the electric fan 7.

Therefore, at the headlight lamp 5R on the right side having a positive pressure inside, the discharge of interior air is promoted because the density of the water-repellant filter 13' is low, and at the headlight lamp 5L on the left side having a negative pressure inside, the flow of outside air can be suppressed because the density of the water-repellant filter 13 is higher than that of the headlight lamp 5L on the left side. Therefore, while the unevenness in the anti-fogging performance in the left and right headlight lamps 5L and 5R that originates in the direction of the rotation of the electric fan 7 is adjusted by changing the density of the water-repellant filters, the anti-fogging performance is increased, and the illumination performance that is even on the left and right can be maintained. Moreover, both breathing holes 12 can be opened and water-repellant filters 13 and 13' provided there as well.

Figure 10:
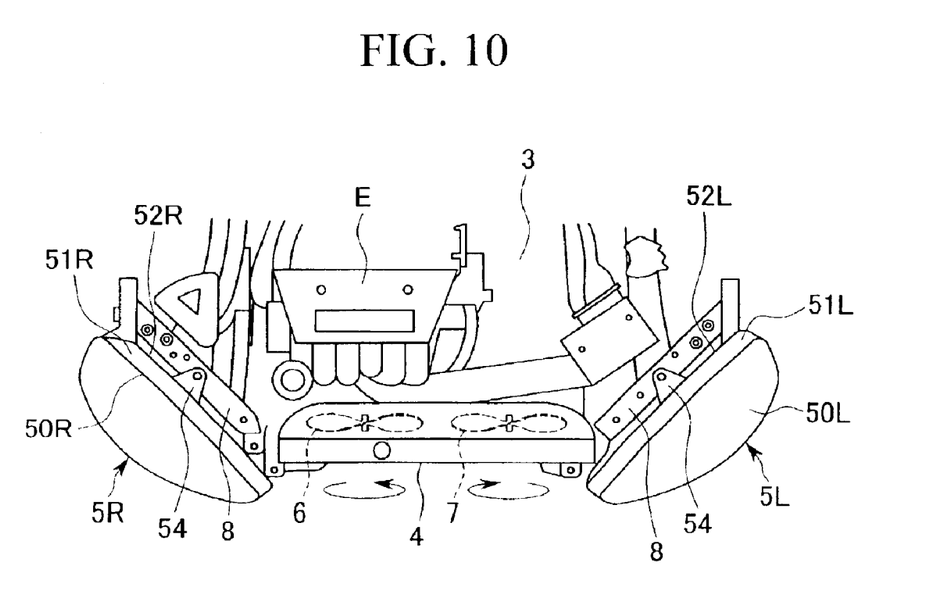
FIG. 10 is a partial frontal view showing the inside of the engine compartment in the fifth embodiment.

Next, aided by FIG. 1 to FIG. 3, a fifth embodiment of the invention will be explained with reference to FIG. 10 and FIG. 11. Moreover, parts identical to those of the first embodiment will be explained using identical reference numerals. As shown in FIG. 10, this embodiment is structured so that the radiator fan 6 and the electric fan 7 rotate in mutually different directions.

Therefore, unlike FIG. 2, no bias in the pressure occurs in the environment in which each of the headlight lamps are placed that originates an air flow that is biased due to the radiator fan 6 and the electric fan 7, but because the engine E in the engine compartment 3 is disposed in a position offset to the right in the compartment, the temperature conditions where each of the headlight lamps 5L and 5R are placed are different.

Specifically, considering that there is much incorporated moisture because the temperature of the air in the vicinity increases as it gets closer to the engine E, the structure is such that, in comparison to the headlight lamp 5L on the side distant from the engine E, the breathing operation of the headlight lamp 5R on the side close to the engine E can be carried out smoothly.

Figure 11A:
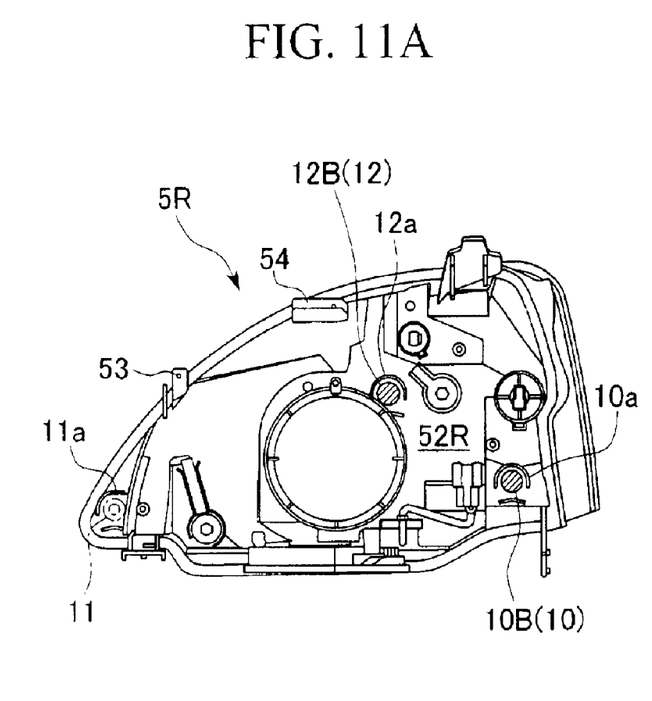
FIGS. 11A and 11B are back views of the left and right headlight lamp housings in the fifth embodiment.
Figure 11B:
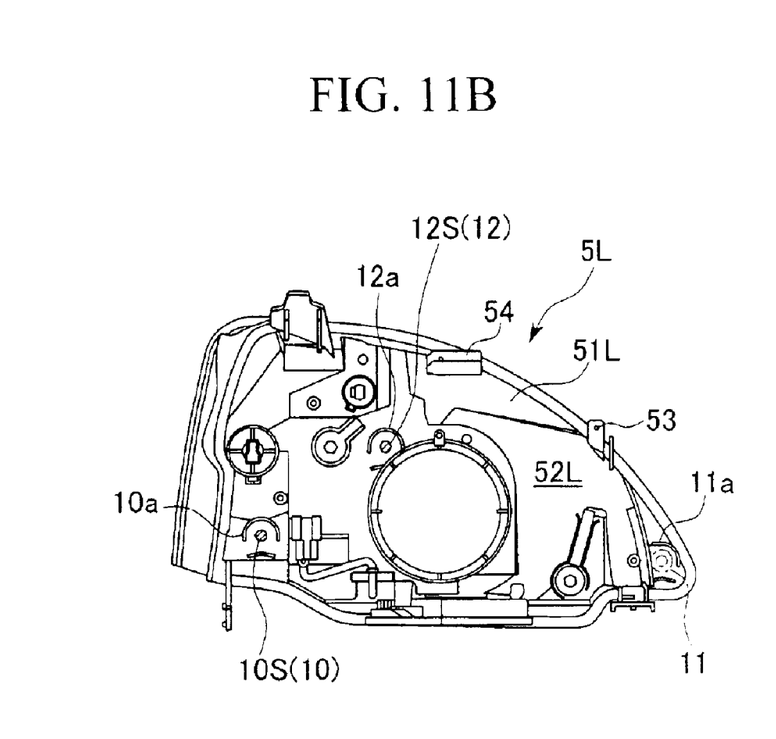

Concretely, as shown in FIG. 11, because each of the breathing holes 10 and 12 of the headlight lamp 5R on the right side close to the engine E is set so as to have a larger aperture area than each of the breathing holes 10 and 12 of the headlight lamp 5L on the left side distant from the engine E, breathing holes 10S and 12S having a small size are formed in the headlight lamp 5L on the left side and breathing holes 10B and 12B having a large size are formed in the headlight lamp 5R on the right side. Note that breathing hole 12 is not opened. Therefore, the headlight lamps 5L and 5R have a structure that is substantially identical to that shown in FIG. 5.

That is, because the headlight lamp 5R on the right side is positioned near the engine E under high temperature conditions, there is the possibility that there is much moisture incorporated in the air. Thus, the large sized breathing holes 10B and 12B are structured such that even if air is drawn into the engine compartment 3, it can be immediately discharged and the breathing operation can be carried out smoothly, and can thereby contribute to the anti-fogging performance to the same degree as the headlight lamp 5L on the left side.

Therefore, according to this embodiment, even if air having a high humidity flows into the headlight lamp 5R on the right side near the engine E that is more disadvantageous in terms of condensation, it can easily be discharged making it difficult for air to stagnate. Thus, the unevenness in anti-fogging performance between the left and right headlight lamps 5L and 5R originating in the offset disposition of the engine E can be adjusted by providing a structure in which the breathing mechanisms on the left and right are different, the antifogging performance can be increased, and the evenness of the illumination performance on the left and right can be maintained.

Here, in the fifth embodiment described above, the breathing action was carried out smoothly by focusing on the size of the breathing holes and making the aperture area of the headlight lamp 5R on the right side, which is close to the engine E, large. However, as shown in FIG. 6 for the second embodiment, it is also possible to provide three breathing holes 10, 11, 12 in the headlight lamp 5R on the right side, which is near the engine E, provide two breathing holes 10 and 12 in the headlight lamp 5L on the left side, which is distant from the engine E, and increase the number of breathing holes in the headlight lamp 5R on the right side, which is close to the engine E.

In the case of this type of structure, because it is possible to discharge easily the high temperature air close to the engine E that includes much moisture from the many breathing holes 10, 11, and 12, it is possible to eliminate the unevenness in the anti-fogging performance in the headlight lamps 5L and 5R on the left and right that is caused by the offset disposition of the engine E.

Figure 8:
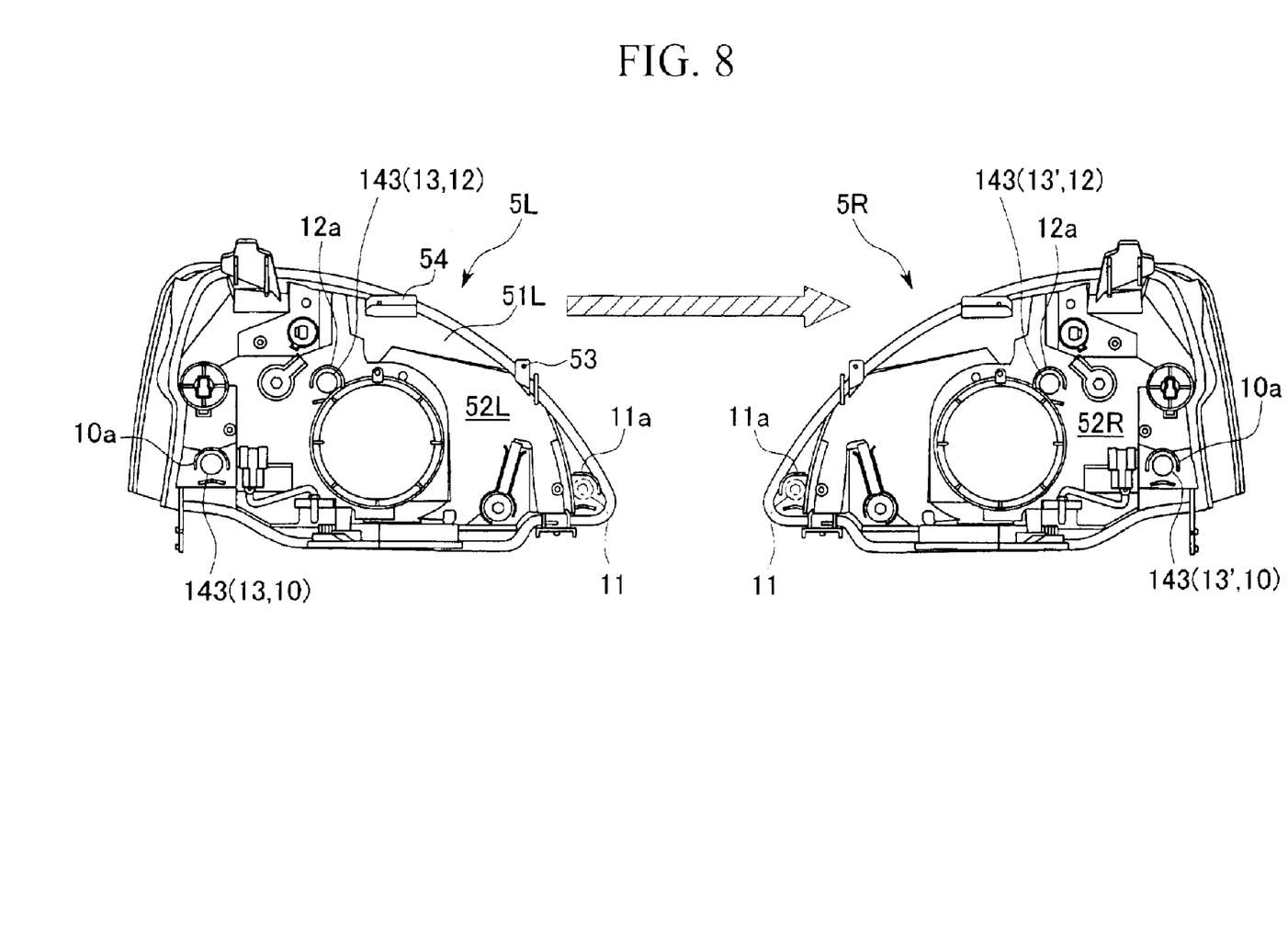
FIG. 8 is a back view of the left and right headlight lamp housings in the fourth embodiment.

In addition, as shown in FIG. 8 for the fourth embodiment, the breathing mechanism is formed by breathing holes 10 and 12 of the filter mounting part 131 formed in the back walls 52L and 52R of the lamp housings 51L and 51R and water-repellant filters 13 and 13' that cover the same. It is also possible to use a water-repellant filter 13' of the headlight lamp 5R on the right side near the engine E that has a lower density than the water-repellant filter 13 of the headlight lamp 5L on the left side distant from the engine E.

In the case of this type of structure, because the high temperature air near the engine E that includes much moisture can pass through the low density water-repellant filter 13' that has low resistance and thereby be easily discharged, it is possible to eliminate the unevenness in the anti-fogging performance in the headlight lamps 5L and 5R on the left and right that originates in the offset disposition of the engine E.

Moreover, in the above-described embodiments of the invention, the case in which the engine is placed towards the side was explained. However, it is possible to apply the invention in the case wherein the engine is placed in the center part in the transverse direction. In this case, if the influence of the heat originating in the other auxiliary devices is ignored, the heat bias due to the heat of the engine is identical at the left and right headlight lamps, and thus the only influence on the left and right headlight lamps is the unbalanced pressure due to the radiator fan and the like. Therefore, in this case, the breathing mechanism can be set taking into consideration this unbalance in the pressure due to the radiator fan.

In addition, in the first through fourth embodiments, the breathing mechanisms are structured differently in the left and right headlights taking into consideration only the bias in pressure applied to each of the headlight lamps due to the radiator fan, but as shown in FIG. 2, the unevenness in the anti-fogging performance of the left and right headlight lamps can be even further reduced by taking into consideration the disposition of the engine, which is offset to the right side, the size of the breathing holes, which make up the breathing mechanism, the number of locations, and finer adjustment of the density of the water-repellant filters.

In addition, although each of the embodiments was explained focusing on the size and number of the breathing holes, it is possible to apply various structures for more reliably preventing the penetration of air containing much moisture into the headlight lamps. For example, the discharge of air in the headlight lamps can be made smooth by setting the direction of the breathing holes to conform to the flow of the air, or, focusing on the fact that within the engine compartment the temperature is high in the upper portion, air holes can be formed as far as possible on the bottom side where the temperature is low.

In addition, the structure of a combination of a radiator fan and an electric fan was explained, but a structure can also be applied in which only a radiator fan is disposed.

In addition, the shape and the number of breathing holes are only one example, and are not limited by the embodiments described above.

As described above, according to a first aspect of the invention, by taking into consideration the flow of the air produced by the radiator fan, it is possible to use a structure in which the air in the lamp housing can be easily discharged and the air flows into the lamp housing with difficulty. Thereby, the effects can be obtained that the unevenness in the anti-fogging performance produced in the left and right headlight lamps can be adjusted by structuring the breathing mechanisms on the left and right differently, the anti-fogging performance can be increased, and the evenness of the illumination performance on the left and right can be maintained.

According to a second aspect of the invention, the inflow of external air can be suppressed as much a possible in the headlight lamp having a negative pressure inside and the discharge of internal air in the headlight lamp having a positive pressure inside can be promoted as much as possible. Thereby, the effect is obtained that the variation in the anti-fogging performance in the left and right headlight lamps originating in the direction of the rotation of the radiator fan can be adjusted by varying the aperture area of the breathing holes, the anti-fogging performance can be increased, and the evenness of the illumination performance on the left and right can be maintained.

According to a third aspect of the invention, the discharge of air from inside the headlight lamp having a negative pressure inside is promoted and the inflow of air into the headlight lamp having a negative pressure inside is suppressed. Thereby, the effects are obtained that the variation in the anti-fogging performance in the left and right headlight lamps that originates in the direction of the rotation of the radiator fan is adjusted by varying the number of breathing holes, the anti-fogging performance can be increased, and the evenness of the illumination performance on the left and right can be maintained.

According to a fourth aspect of the invention, it becomes possible to discharge the air in each of the headlight lamps such that it is drawn out from the breathing holes opened downstream of the airflow having a low pressure. Thereby, the effects are obtained that the variation in the anti-fogging performance in the left and right headlight lamps originating in the direction of the rotation of the radiator fan can be adjusted by discharging the air inside both headlight lamps, the anti-fogging performance can be increased, and the evenness of the illumination performance on the left and right can be maintained.

According to a fifth aspect of the invention, the discharge of internal air in the headlight lamp having a positive pressure inside can be promoted as much as possible and the inflow of external air can be suppressed as much a possible in the headlight lamp having a negative pressure inside. Thereby, the effect is obtained that the variation in the anti-fogging performance in the left and right headlight lamps originating in the direction of the rotation of the radiator fan can be adjusted by varying the density of the filters, the anti-fogging performance can be increased, and the evenness of the illumination performance on the left and right can be maintained.

According to a sixth aspect of the invention, taking into consideration that the closer to the engine the greater the moisture included in the air, it is possible to make it difficult for the air in the headlight lamps on the side close to the engine difficult to stagnate in comparison to the headlight lamp on the side distant from the engine. Thereby, the effect is obtained that the variation in the anti-fogging performance in the left and right headlight lamps caused by the direction of the rotation of the radiator fan can be adjusted by structuring the breathing mechanisms on the left and right differently, the anti-fogging performance can be increased, and the evenness of the illumination performance on the left and right can be maintained.

According to a seventh aspect of the invention, even if high temperature air that includes much moisture close to the engine flows into the lamp housing, it can be discharged easily from the breathing holes having a large aperture area. Thereby, the variation in the anti-fogging performance in the left and right headlight lamps that originates in the offset disposition of the engine can be adjusted by forming the aperture area of the breathing mechanisms on the left and right differently, the anti-fogging performance can be increased, and the evenness of the illumination performance on the left and right can be maintained.

According to an eighth aspect of the invention, even if the high temperature air that includes much moisture near the engine flows into the lamp housing, it is possible to discharge it easily from the many breathing holes by passing through a low density filter having a low resistance. Thereby, the variation in the anti-fogging performance in the left and right headlight lamps that originates in the offset disposition of the engine can be adjusted by providing differing numbers of breathing holes on the left and right, the anti-fogging performance can be increased, and the evenness of the illumination performance on the left and right can be maintained.

According to a ninth aspect of the invention, even if the high temperature air that includes much moisture near the engine flows into the lamp housing, it is possible to discharge it easily from the many breathing holes by passing through a low density filter having a low resistance. Thereby, the variation in the anti-fogging performance in the left and right headlight lamps that originates in the offset disposition of the engine can be adjusted by providing filters on the left and right that have differing densities, the anti-fogging performance can be increased, and the evenness of the illumination performance on the left and right can be maintained.

What is claimed is:

1. An anti-fogging structure for headlight lamps provided on left and right sides of a radiator fan at a front of a body of a vehicle, wherein each headlight lamp comprises:
   a headlight lamp housing for housing each headlight lamp; and
   a breathing mechanism that enables circulation of air into and out of the lamp housing, said breathing mechanism being adapted to allow different air circulation between the left and right headlight lamp housings, respectively, in order to cope with different conditions due to placement of left and right headlight lamp housings.

2. An anti-fogging structure for headlight lamps provided on left and right sides of a radiator fan at a front of a body of a vehicle, wherein each headlight lamp comprises:
   a headlight lamp housing for housing each headlight lamp; and
   a breathing mechanism that enables circulation of air into and out of the lamp housing for allowing different air circulation for left and right headlight lamp housings, respectively, in order to cope with different conditions due to placement of left and right headlight lamp housings, respectively,
   wherein said breathing mechanism comprises breathing holes formed in the back walls of the lamp housings, and the breathing holes of the headlight lamp housings on the left or right side of the vehicle where the pressure inside the lamp housing is negative due to the rotation of the radiator fan are set so that their aperture areas are smaller than those of the breathing holes of the headlight lamp housing on the side where the pressure inside the lamp housing is positive due to the rotation of the radiator fan.

3. An anti-fogging structure for headlight lamps provided on left and right sides of a radiator fan at a front of a body of a vehicle, wherein each headlight lamp comprises:

a headlight lamp housing for housing each headlight lamp; and a breathing mechanism that enables circulation of air into and out of the lamp housing for allowing different air circulation for left and right headlight lamp housings, respectively, in order to cope with different conditions due to placement of left and right headlight lamp housings, wherein said breathing mechanism comprises breathing holes formed in the back walls of the headlight lamp housing, and the number of breathing holes of the headlight lamp housing on the side where the pressure inside the lamp housing is positive due to the rotation of the radiator fan is greater than the number of breathing holes of the headlight lamp housing on the side were the pressure inside the lamp housing is negative due to the rotation of the radiator fan.

4. An anti-fogging structure for headlight lamps provided on left and right sides of a radiator fan at a front of a body of a vehicle, wherein each headlight lamp comprises:

a headlight lamp housing for housing each headlight lamp; and a breathing mechanism that enables circulation of air into and out of the lamp housing for allowing different air circulation for left and right headlight lamp housings, respectively, in order to cope with different conditions due to placement of left and right headlight lamp housings, wherein said breathing mechanism comprises breathing holes formed in the back wall of the lamp housing, and in the case than an air flow is generated due to the rotation of the radiator fan, each of the breathing holes in the headlight lamp housing is formed downstream of said airflow.

5. An anti-fogging structure for headlight lamps provided on left and right sides of a radiator fan at a front of a body of a vehicle, wherein each headlight lamp comprises:

a headlight lamp housing for housing each headlight lamp; and a breathing mechanism that enables circulation of air into and out of the lamp housing for allowing different air circulation for left and right headlight lamp housings, respectively, in order to cope with different conditions due to placement of left and right headlight lamp housings, wherein said breathing mechanism comprises breathing holes formed in the back wall of the lamp housing and filters that cover the breathing holes and the filter for the headlight lamp housing on the side where the pressure inside the headlight lamp housing is positive due to the rotation of the radiator fan has a density that is lower than the filter for the headlight lamp housing on the side where the pressure inside the headlight lamp is negative due to the rotation of the radiator fan.

6. An anti-fogging structure for headlight lamps provided on left and right sides at a front part of a body of a vehicle having an engine in an engine compartment that is disposed offset either to the left or right, and breathing mechanisms than enables circulation of air into and out of the lamp housing, said breathing mechanisms being structured such that air circulates differently between the left and right headlight lamps, respectively.

7. An anti-fogging structure for headlight lamps provided on left and right sides at a front part of a body of a vehicle having an engine in an engine compartment that is disposed offset either to the left or right, and the breathing mechanism that enables circulation of air into and out of the lamp housing, said breathing mechanism being structured such that air circulates differently in the left and right headlight lamps, respectively, wherein said breathing mechanism comprises breathing holes, and the breathing holes for the headlight lamp housing on the side near the engine have an aperture area set larger than the breathing holes in the headlight lamp housing on the side distant from the engine.

8. An anti-fogging structure for headlight lamps provided on left and right sides at a front part of a body of a vehicle having an engine in an engine compartment that is disposed offset either to the left or right, and the breathing mechanism that enables circulation of air into and out of the lamp housing, said breathing mechanism being structured such that air circulates differently in the left and right headlight lamps, respectively, wherein said breathing mechanism comprises breathing holes, and the number of breathing holes in the headlight lamp on the side near the engine is greater than the number of breathing holes in the headlight lamp on the side distant from the engine.

9. An anti-fogging structure for headlight lamps provided on left and right sides at a front part of a body of a vehicle having an engine in an engine compartment that is disposed offset either to the left or right, and the breathing mechanism that enables circulation of air into and out of the lamp housing, said breathing mechanism being structured such that air circulates differently in the left and right headlight lamps, respectively, wherein said breathing mechanism comprises breathing holes formed in the back wall of the lamp housing and a filter that covers them, and the filters in the headlight lamp on the side near the engine have a lower density than the filters in the headlight lamp on the side distant from the engine.

* * * * *